United States Patent
Suzuki

(10) Patent No.: US 8,400,204 B2
(45) Date of Patent: Mar. 19, 2013

(54) DC OFFSET CANCEL CIRCUIT, SEMICONDUCTOR DEVICE, AND RECEIVING DEVICE

(75) Inventor: Shigeya Suzuki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 233 days.

(21) Appl. No.: 12/923,675

(22) Filed: Oct. 4, 2010

(65) Prior Publication Data

US 2011/0080204 A1    Apr. 7, 2011

(30) Foreign Application Priority Data

Oct. 6, 2009  (JP) ................. 2009-232641

(51) Int. Cl.
*H03L 5/00* (2006.01)
(52) U.S. Cl. ........................................ 327/307
(58) Field of Classification Search .............. 327/307
See application file for complete search history.

(56) References Cited

U.S. PATENT DOCUMENTS

| | | | | |
|---|---|---|---|---|
| 6,509,777 B2* | 1/2003 | Razavi et al. | ................. | 327/307 |
| 6,642,767 B2* | 11/2003 | Wang | ................. | 327/307 |
| 6,700,514 B2* | 3/2004 | Soltanian et al. | ............. | 341/118 |
| 6,995,595 B2* | 2/2006 | Kim | ................. | 327/254 |
| 7,277,688 B2* | 10/2007 | Yang et al. | ................. | 455/296 |

OTHER PUBLICATIONS

"LSI for GPS AK1518", [online], Asahi Kasei Microdevices Corporation, [searched on Sep. 8, 2009], Internet <URL:http://www.asahi-kasei.co.jp/akm/japanese/product/ak1518/ak1518.html>.

* cited by examiner

*Primary Examiner* — Hai L Nguyen
(74) *Attorney, Agent, or Firm* — McGinn IP Law Group, PLLC

(57) ABSTRACT

A DC offset cancel circuit includes, in each of an I-channel side and a Q-channel side, a mixer and an ADC that output differential signals. The DC offset cancel circuit further includes a direct-current component extractor. The direct-current component extractor extracts direct-current components from a signal I and a signal Ib output from the mixer in the I-channel side and a signal Q and a signal Qb output from the mixer in the Q-channel side. The ADC in the I-channel side receives signals in which the direct-current components extracted from the signal Q and the signal Qb are fed forward to the signal I and the signal Ib. The ADC in the Q-channel side receives signals in which the direct-current components extracted from the signal I and the signal Ib are fed forward to the signal Q and the signal Qb.

16 Claims, 6 Drawing Sheets

US 8,400,204 B2

DC OFFSET CANCEL CIRCUIT, SEMICONDUCTOR DEVICE, AND RECEIVING DEVICE

INCORPORATION BY REFERENCE

This application is based upon and claims the benefit of priority from Japanese patent application No. 2009-232641, filed on Oct. 6, 2009, the disclosure of which is incorporated herein in its entirety by reference.

BACKGROUND

1. Field of the Invention

The present invention relates to a DC offset cancel circuit, a semiconductor device, and a receiving device, and more particularly, to a DC offset cancel circuit, a semiconductor device, and a receiving device including an I-channel and a Q-channel that are perpendicular to each other.

2. Description of Related Art

In recent years, high sensitivity and high accuracy in a receiving IC (Integrated Circuit) of a GPS (Global Positioning System) have been among the most significant problems in forming a GPS receiving device. Therefore, there is an increasing demand for improving the performance of an analog-digital converter (hereinafter referred to as ADC) that converts a received analog signal to a digital signal processed by a base band IC.

On the other hand, manufacturing variations due to miniaturization of semiconductor device manufacturing processes for achieving downsizing and low power consumption should not be negligible. When a DC offset component of a differential signal input to the ADC increases due to the relative variation, the ADC cannot normally convert analog signals to digital signals. This leads to degradation of the receiving sensitivity and the receiving accuracy of the GPS receiving device. The mechanism of this phenomenon is explained with reference to FIGS. 5 to 7. FIG. 5 is a block diagram showing the occurrence of a DC offset component in an ADC. FIG. 6 is a graph showing input/output signal waveforms of the ADC when there is no DC offset component. FIG. 7 is a graph showing input/output signal waveforms of the ADC when there is a DC offset component.

As shown in FIG. 5, a signal I (or signal Q) and a signal Ib (or signal Qb) are input to an ADC 20 in an I-channel side (or Q-channel side). The signal I (or signal Q) and the signal Ib (or signal Qb) are differential signals. The ADC 20 converts the signals to two-bit signals and outputs the signals as an output signal Imag (or output signal Qmag) and an output signal Isign (or output signal Qsign). At this time, a DC offset component ΔVin is generated between the signal I and the signal Ib.

In this configuration, the output signal Imag and the output signal Isign are generated. The output signal Imag is the two-bit output signal generated by comparing the signal I with a threshold voltage Vth. The output signal Isign is the two-bit output signal generated by comparing the signal I with the signal Ib. In this configuration, when there is no DC offset component, for example, the duty ratios of the output signal Imag and the output signal Isign are 50:50 as shown in FIG. 6. On the other hand, when there is a DC offset component ΔVin corresponding to 30% of the amplitude, for example, in this configuration, the duty ratios of the output signal Imag and the output signal Isign vary as shown in FIG. 7. In this case, the duty ratio of the output signal Imag is 62:38, and the duty ratio of the output signal Isign is 55:45. In summary, the presence of the DC offset varies the duty ratio of the digital signal output from the ADC, which degrades the signal quality. This causes degradation of the receiving sensitivity and the receiving accuracy of the GPS receiving device.

Take an LSI for GPS (Large Scale Integration) as an example, a method of reducing the DC offset component is explained. FIG. 8 is a block diagram of a DC offset cancel circuit 300 in AK1518 which is the LSI for GPS ("LSI for GPS AK1518", [online], ASAHI KASEI MICRODEVICES CORPORATION, [searched on Sep. 8, 2009], Internet <URL:http://www.asahi-kasei.co.jp/akm/japanese/product/ak1518/ak1518.html>). As shown in FIG. 8, the DC offset cancel circuit 300 includes a mixer 21, an IF unit 22, and an ADC 24 connected to each of an I-channel side and a Q-channel side. The IF unit 22 is the amplifier having a gain of A times. The ADC 24 is the two-bit ADC. Further, the signal components of the I-channel and the Q-channel are perpendicular to each other.

The IF unit 22 includes an IF amplifier 31, an IF-LPF (Low Pass Filters) 32, and an IF-AGC (Automatic Gain Control) amplifier 33. The output of the IF unit 22 is connected to input parts of a DC offset cancel amplifier 26 and the ADC 24.

The DC offset cancel amplifier 26 is the amplifier having a gain of B times. The DC offset cancel amplifier 26 has an output corresponding to a signal I connected to an input corresponding to a signal Ib of the IF unit 22. An output corresponding to the signal Ib is connected to an input corresponding to the signal I of the IF unit 22. An output corresponding to a signal Q is connected to an input corresponding to a signal Qb of the IF unit 22. An output corresponding to the signal Qb is connected to an input corresponding to the signal Q of the IF unit 22.

The ADC 24 in the I-channel side outputs an output signal Imag and an output signal Isign. The ADC 24 in the Q-channel side outputs an output signal Qmag and an output signal Qsign.

Subsequently, an operation of the DC offset cancel circuit 300 will be described. The DC offset cancel circuit 300 generates four-phase signals whose phases are shifted by 90° each other. The mixer 21 in the I-channel side generates the signal I (0° and the signal Ib (180° that are differential signals according to an RF signal and an LO signal that are input, and outputs the generated signals to the IF unit 22. The mixer 21 in the Q-channel side generates the signal Q (90° and the signal Qb (270° that are differential signals that are perpendicular to the I-channel side according to the RF signal and the LO signal that are input, and outputs the generated signals to the IF unit 22.

The IF unit 22 amplifies the signal I, the signal Ib, the signal Q, and the signal Qb and outputs the amplified signals to the DC offset cancel amplifier 26 and the ADC 24.

The DC offset cancel amplifier 26 extracts a direct-current component of the output corresponding to the signal I of the IF unit 22 and feeds back the direct-current component to the input corresponding to the signal Ib of the IF unit 22. Further, the DC offset cancel amplifier 26 extracts a direct-current component of the output corresponding to the signal Ib of the IF unit 22 and feeds back the direct-current component to the input corresponding to the signal I of the IF unit 22. Similarly, the DC offset cancel amplifier 26 extracts a direct-current component of the output corresponding to the signal Q of the IF unit 22 and feeds back the direct-current component to the input corresponding to the signal Qb of the IF unit 22. Further, the DC offset cancel amplifier 26 extracts a direct-current component of the output corresponding to the signal Qb of the IF unit 22 and feeds back the direct-current component to the input corresponding to the signal Q of the IF unit 22. Accordingly, the DC offset components between the signal I and the signal Ib and between the signal Q and the signal Qb are cancelled.

The ADC 24 outputs the output signal Imag, the output signal Isign, the output signal Qmag, and the output signal Qsign that are two-bit digital signals based on the input signals.

In short, the DC offset components generated in the mixer 21 and the IF unit 22 are independently cancelled by the I-channel and the Q-channel, respectively. As described above, the gain of the IF unit 22 is A, and the gain of the DC offset cancel amplifier 26 is B. Accordingly, the DC offset component ΔVout in the output part of the IF unit 22 corresponding to the DC offset component ΔVin generated between the signal I and the signal Ib is expressed by the expression (1).

$$\Delta Vout = 1/B \times \Delta Vin \qquad (1)$$

When the DC offset cancel amplifier is not employed, the expression (1) is ΔVout=A×ΔVin.

SUMMARY

The present inventors have found the problem as follows by examining the above technique. The DC offset cancel circuit 300 described above independently cancels the DC offset components of the I-channel and the Q-channel. As a result, the DC offset component is expressed by ΔVout=1/B× ΔVin. Further reduction in the DC offset is required, however, in an LSI for GPS and so on where there is an increasing demand for higher performance.

A first exemplary aspect of an embodiment of the present invention is a DC offset cancel circuit including: a first mixer that converts an analog signal to output first differential signals; a second mixer that converts the analog signal to output second differential signals, the second differential signals having a phase perpendicular to a phase of the first differential signal; a direct-current component extractor that extracts direct-current components from the first differential signals and the second differential signals; a first AD converter that receives signals in which the direct-current components extracted from the second differential signals are fed forward to the first differential signals; and a second AD converter that receives signals in which the direct-current components extracted from the first differential signals are fed forward to the second differential signals.

The DC offset cancel circuit according to one aspect of the present invention mutually averages the DC offset components between the first differential signals and the second differential signals. Accordingly, the DC offset components are mutually reduced between the first differential signals and the second differential signals.

The present invention provides a DC offset cancel circuit that enables to reduce the DC offset components by averaging the DC offset components between the I-channel and the Q-channel.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
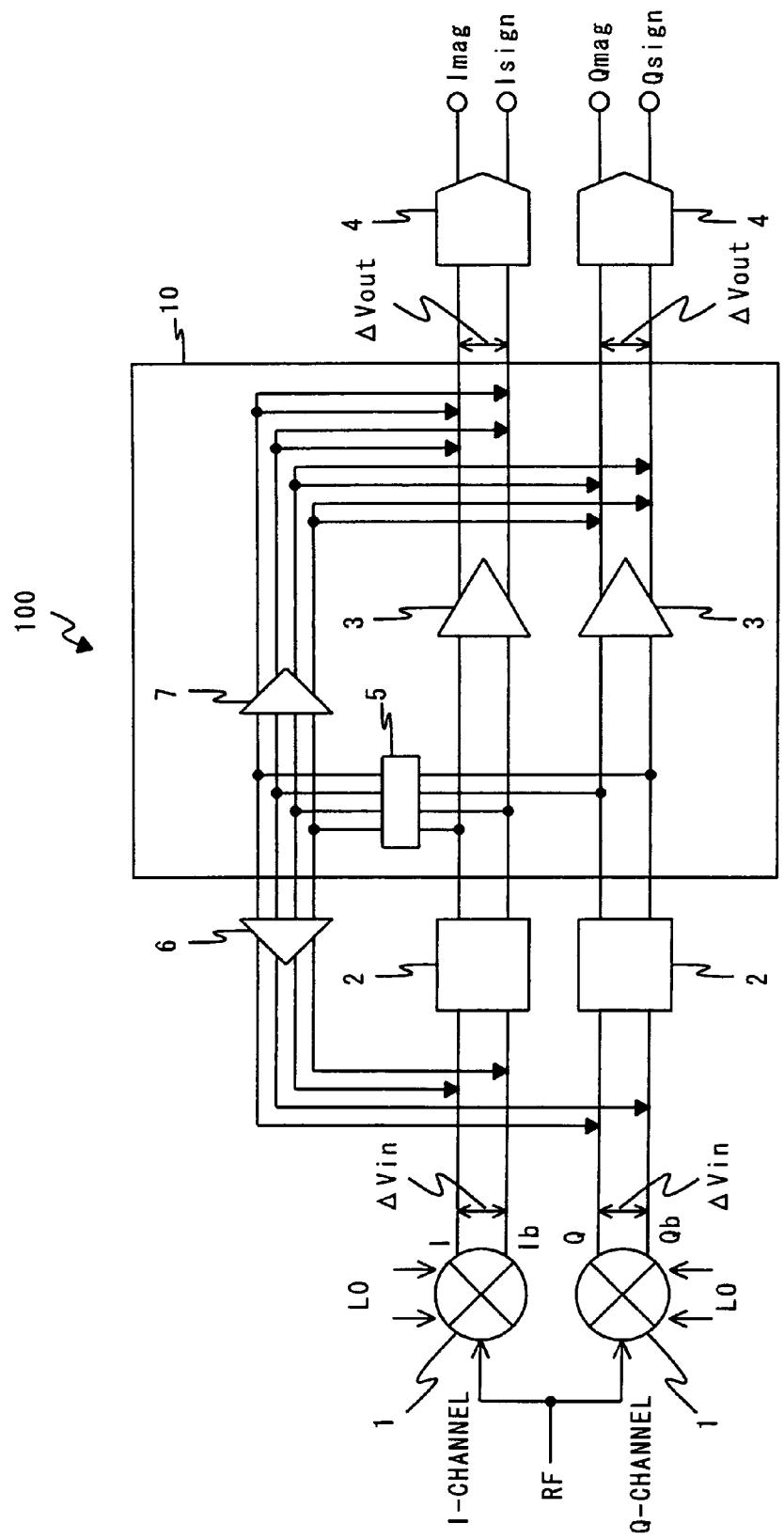
FIG. 1 is a block diagram of a DC offset cancel circuit according to a first exemplary embodiment.

A specific exemplary embodiment incorporating the present invention is described hereinafter with reference to the drawings. In the drawings, same components are marked with the same reference numerals, and duplicated explanation is omitted as appropriate.

First Exemplary Embodiment

FIG. 1 is a block diagram of a DC offset cancel circuit 100 according to a first exemplary embodiment. A configuration of the DC offset cancel circuit according to the first exemplary embodiment will be described with reference to FIG. 1. As shown in FIG. 1, the DC offset cancel circuit 100 includes a mixer 1, an IF unit 2, a buffer 3, and an ADC 4 connected to each of an I-channel side and a Q-channel side. The IF unit 2 is an amplifier of a gain A, and the ADC 4 is a two-bit ADC. Further, signal components of the I-channel and the Q-channel are perpendicular to each other.

Outputs of the IF unit 2 are connected to a DC offset cancel amplifier 6 and a DC offset cancel amplifier 7 through a DC component extractor 5. The DC offset cancel amplifier 6 is the amplifier of a gain B, and the DC offset cancel amplifier 7 is the amplifier of a gain 1.

In the DC offset cancel amplifier 6, an output corresponding to a signal I is connected to an input corresponding to a signal Ib of the IF unit 2. An output corresponding to the signal Ib is connected to an input corresponding to the signal I of the IF unit 2. An output corresponding to the signal Q is connected to an input corresponding to a signal Qb of the IF unit 2. An output corresponding to the signal Qb is connected to an input corresponding to the signal Q of the IF unit 2.

In the DC offset cancel amplifier 7, outputs corresponding to the signal I and the signal Ib are connected to inputs corresponding to the signal Q and the signal Qb of the ADC 4, respectively. Outputs corresponding to the signal Q and the signal Qb are connected to inputs corresponding to the signal I and the signal Ib of the ADC 4, respectively. The I-channel and the Q-channel are mutually connected before or after the buffer 3 through the DC component extractor 5 and the DC offset cancel amplifier 7; the outputs of the IF unit 2 and the inputs of the ADC 4 are cross-connected as shown in a cross-connection part 10.

The ADC 4 in the I-channel side outputs output signals Imag and Isign. The ADC 4 in the Q-channel side outputs output signals Qmag and Qsign.

Next, an operation of the DC offset cancel circuit 100 will be described. The DC offset cancel circuit 100 generates four-phase signals whose phases are shifted by 90° each other. The mixer 1 in the I-channel side generates the signal I (0° and the signal Ib (180° that are differential signals according to an RF signal and an LO signal that are input, and outputs the generated signals to the IF unit 2. The mixer 1 in the Q-channel side generates the signal Q (90° and the signal Qb (270° that are differential signals perpendicular to the I-channel side according to the RF signal and the LO signal that are input, and outputs the generated signals to the IF unit 2.

The IF unit 2 amplifies the signal I, the signal Ib, the signal Q, and the signal Qb, and outputs the amplified signals to the ADC 4 of two bits through the buffer 3. Further, the DC component extractor 5 extracts direct-current components from the signals amplified by the IF unit 2. The DC component extractor 5 outputs the direct-current components to the DC offset cancel amplifier 6 and the DC offset cancel amplifier 7.

The DC offset cancel amplifier 6 feeds back the direct-current component of the output corresponding to the signal I of the IF unit 2 to the input corresponding to the signal Ib of the IF unit 2. Further, the DC offset cancel amplifier 6 feeds back the direct-current component of the output corresponding to the signal Ib of the IF unit 2 to the input corresponding to the signal I of the IF unit 2. Similarly, the DC offset cancel amplifier 6 feeds back the direct-current component of the output corresponding to the signal Q of the IF unit 2 to the input corresponding to the signal Qb of the IF unit 2. Further, the DC offset cancel amplifier 6 feeds back the direct-current component of the output corresponding to the signal Qb of the IF unit 2 to the input corresponding to the signal Q of the IF unit 2. Accordingly, the DC offset components between the signal I and the signal Ib, and between the signal Q and the signal Qb are cancelled.

The DC offset cancel amplifier 7 supplies the direct-current components of outputs corresponding to the signal I and the signal Ib of the IF unit 2 to inputs corresponding to the signal Q and the signal Qb of the ADC 4. Similarly, the DC offset cancel amplifier 7 supplies the direct-current components of outputs corresponding to the signal Q and the signal Qb of the IF unit 2 to inputs corresponding to the signal I and the signal Ib of the ADC 4. Accordingly, the DC offset components between the signal I and the signal Q, between the signal Ib and the signal Qb, the signal I and the signal Qb, and the signal Ib and the signal Q are cancelled.

The ADC 4 outputs the output signal Imag, the output signal Isign, the output signal Qmag, and the output signal Qsign that are digital signals of two bits based on the input signals.

According to this configuration, the DC offset component between the I-channel and the Q-channel is cross-connected by the cross-connection part 10 and averaged. Therefore, the DC offset component between the I-channel and the Q-channel in the input part of the ADC 4 as well as the DC offset component in each of the I-channel and the Q-channel can be cancelled. This point will be explained hereinafter further in detail.

In the DC offset cancel circuit 100, the DC offset component ΔVin generated in the input part of the IF unit 2 is cancelled up to 1/B times by the DC offset cancel amplifier 6. The outputs of the IF unit 2 in this case are represented by I_out1, Ib_out1, Q_out1, and Qb_out1.

Figure 2:
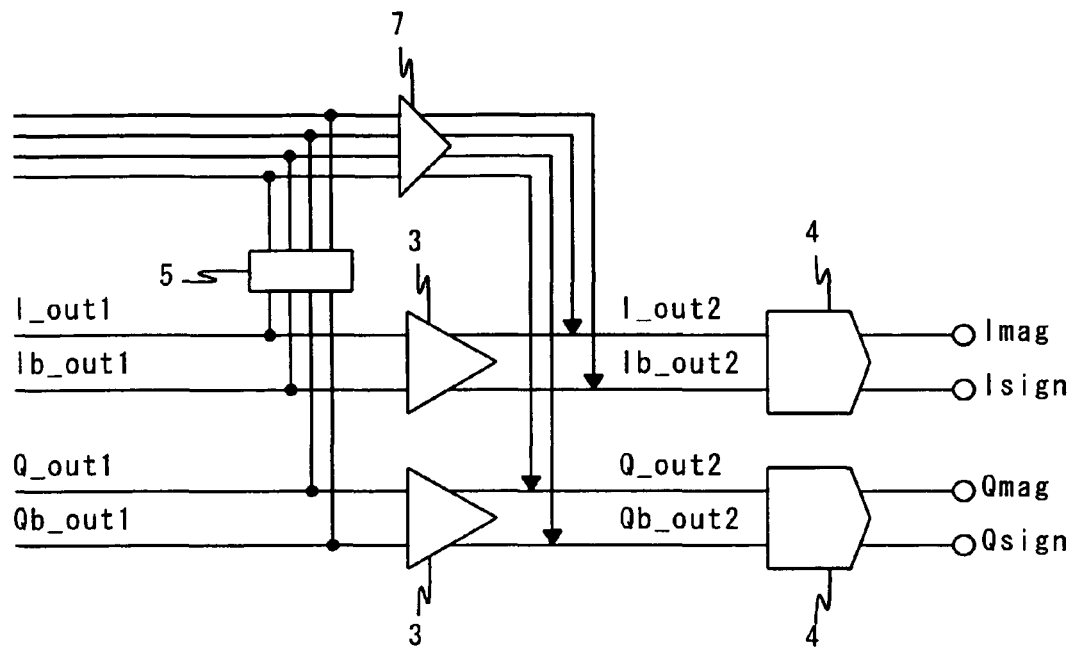
FIG. 2 is a partial block diagram showing an offset cancel operation in the DC offset cancel circuit according to the first exemplary embodiment.

FIG. 2 is a partial block diagram showing a DC offset cancel operation by cross-connection between the signal I and the signal Q and between the signal Ib and the signal Qb. As shown in FIG. 2, the offset components in I_out1, Ib_out1, Q_out1, and Qb_out1 are cancelled by the DC offset cancel amplifier 7. Accordingly, I_out2, Ib_out2, Q_out2, and Qb_out2 are generated. Hence, the following expressions are obtained.

$$I\_out2 = (I\_out1 + Q\_out1)/2$$

$$Ib\_out2 = (Ib\_out1 + Qb\_out1)/2$$

$$Q\_out2 = (I\_out1 + Q\_out1)/2$$

$$Qb\_out2 = (Ib\_out1 + Qb\_out1)/2$$

Figure 3:
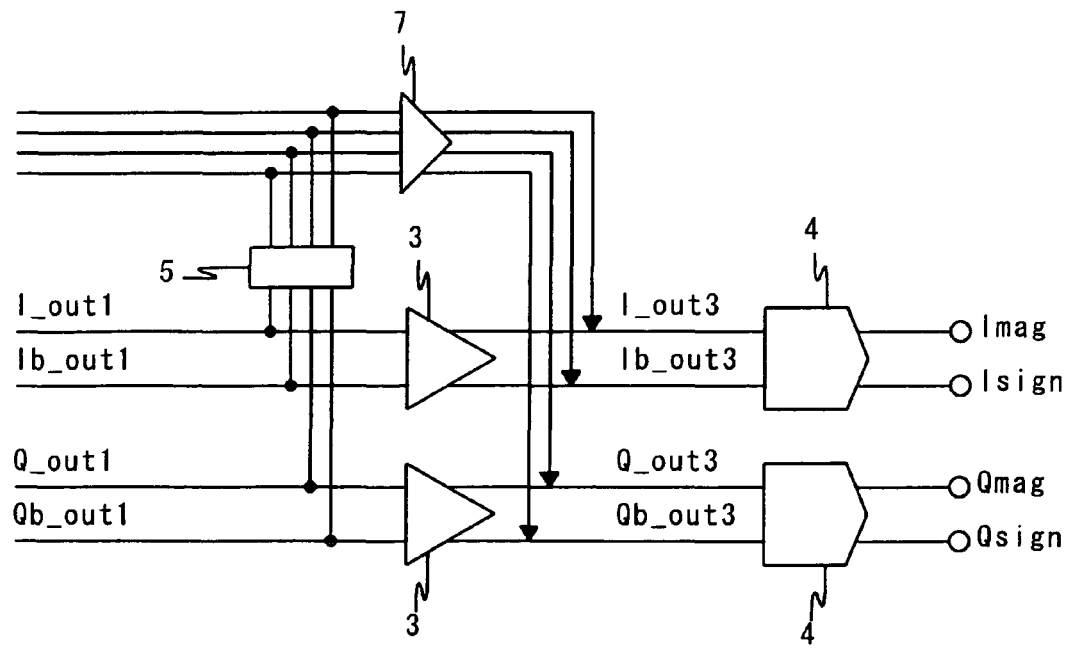
FIG. 3 is a partial block diagram showing an offset cancel operation in the DC offset cancel circuit according to the first exemplary embodiment.

FIG. 3 is a partial block diagram showing a DC offset cancel operation by the cross-connection between the signal I and the signal Qb and between the signal Ib and the signal Q. As shown in FIG. 3, the offset components in I_out1, Ib_out1, Q_out1, and Qb_out1 are cancelled by the DC offset cancel amplifier 7. Accordingly, I_out3, Ib_out3, Q_out3, and Qb_out3 are generated. Thus, the following expressions are obtained.

$$I\_out3 = (I\_out1 + Qb\_out1)/2$$

$$Ib\_out3 = (Ib\_out1 + Q\_out1)/2$$

$$Q\_out3 = (Ib\_out1 + Q\_out1)/2$$

$$Qb\_out3 = (I\_out1 + Qb\_out1)/2$$

From the description above, the DC offset component ΔVout_I in the input part of the ADC 4 in the I-channel side can be expressed by the following expression (2).

$$\Delta V_{out\_I} = I\_out - Ib\_out = \frac{I\_out2 + I\_out3}{2} - \frac{Ib\_out2 + Ib\_out3}{2} \quad (2)$$

$$= \frac{I\_out2 + I\_out3}{2} - \frac{Ib\_out2 + Ib\_out3}{2}$$

$$= \frac{\frac{I\_out1 + Q\_out1}{2} + \frac{I\_out1 + Qb\_out1}{2}}{2} -$$

$$\frac{\frac{Ib\_out1 + Qb\_out1}{2} + \frac{Ib\_out1 + Q\_out1}{2}}{2}$$

$$= \frac{Iout\_1}{2} - \frac{Ib\_out1}{2}$$

$$= \frac{(Iout\_1 - Ib\_out1)}{2}$$

Similarly, the DC offset component ΔVout_Q in the input part of the ADC 4 in the Q-channel side can be expressed by the following expression (3).

$$\Delta V_{out\_Q} = \frac{(Qout\_1 - Qb\_out1)}{2} \quad (3)$$

Figure 8:
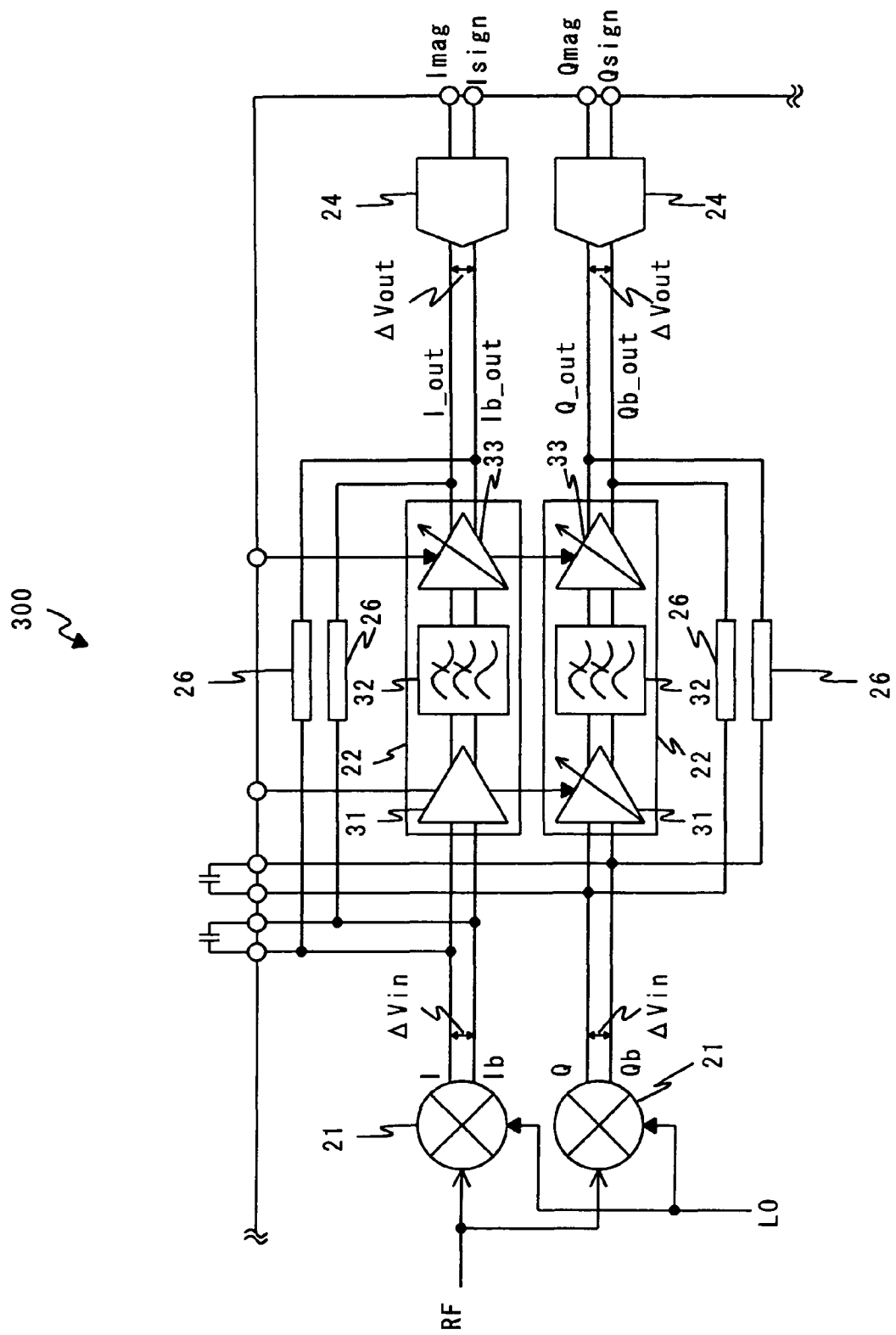
FIG. 8 is a block diagram of a DC offset cancel circuit in AK1518.

As shown in the expressions (2) and (3), the DC offset components can be reduced by half compared with the existing configuration (ΔVout=I_out1−Ib_out1) shown in FIG. 8.

According to this configuration, by incorporating the DC offset cancel circuit described above into the receiving device, degradation of the receiving sensitivity and the receiving accuracy of the receiving device can be suitably suppressed.

Further, according to this configuration, the DC offset cancel circuit which can efficiently reduce the DC offset component can be provided with the simple block configuration. Therefore, the area of the DC offset cancel circuit on the IC can be reduced in this configuration. The DC offset cancel circuit according to this configuration is suitable to be mounted on ICs, which is advantageous for achieving downsizing and cost reduction of ICs.

First Example

Figure 4:
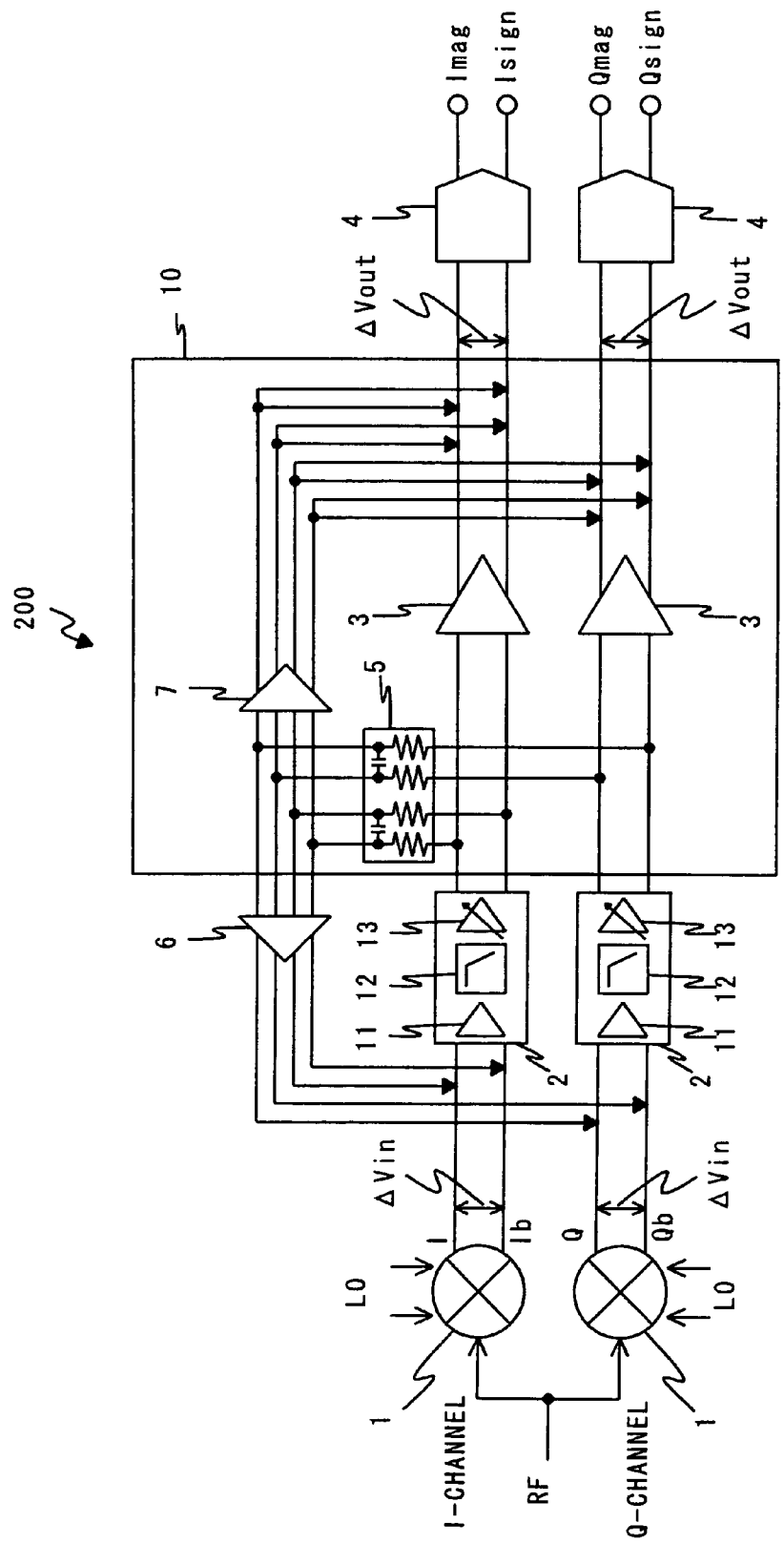
FIG. 4 is a block diagram of a DC offset cancel circuit according to a first example.
Figure 5:
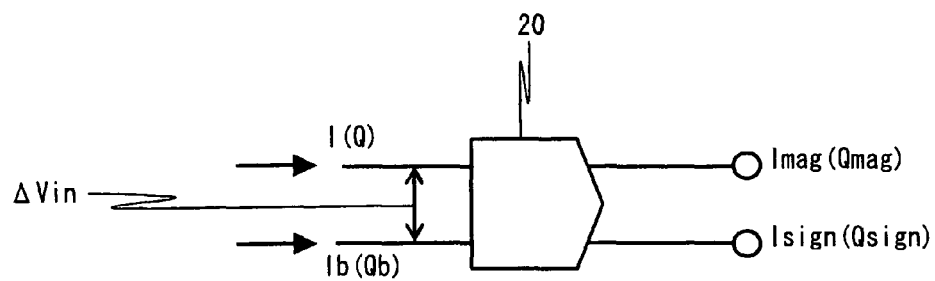
FIG. 5 is a block diagram showing the occurrence of a DC offset component in an ADC.
Figure 6:
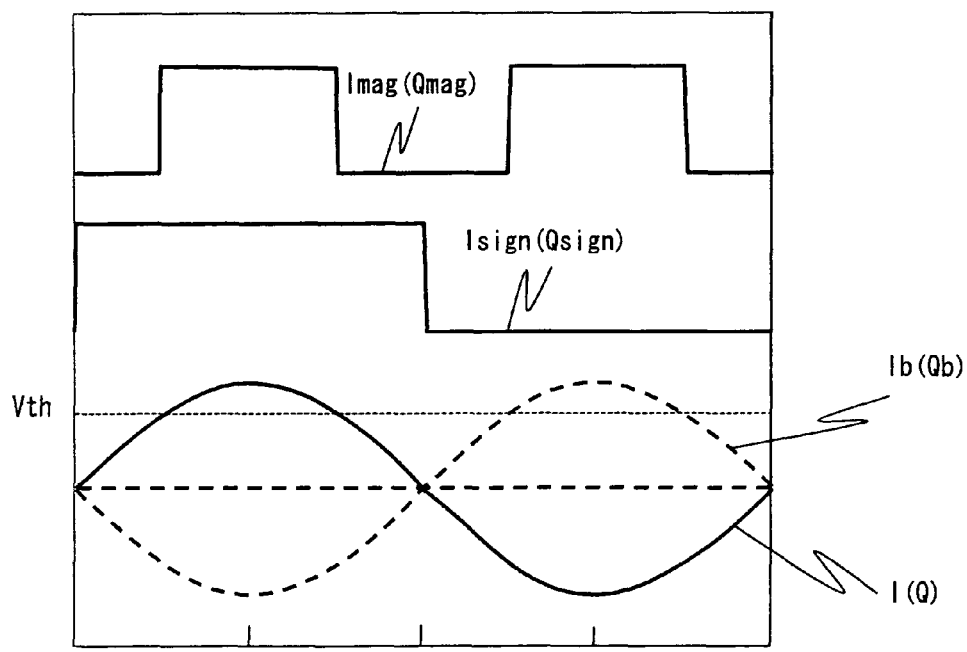
FIG. 6 is a graph showing input/output signal waveforms of the ADC when there is no DC offset.
Figure 7:
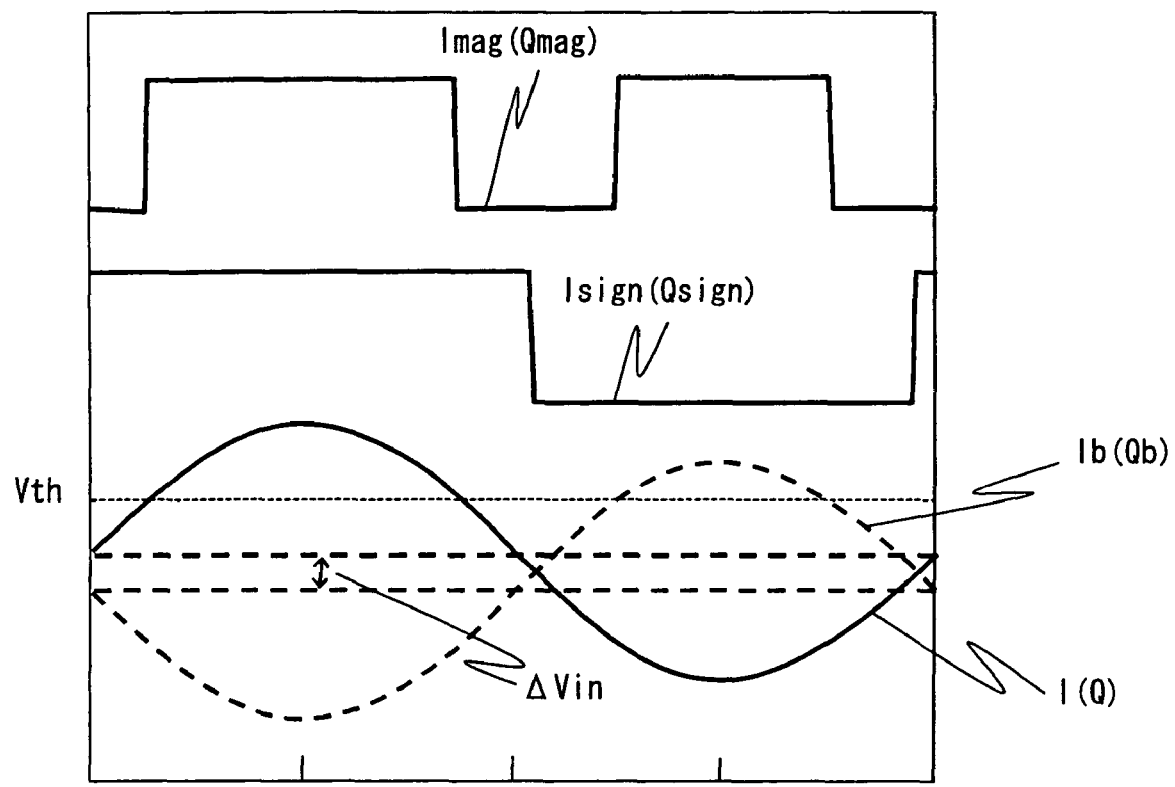
FIG. 7 is a graph showing input/output signal waveforms of the ADC when there is a DC offset.

A first example will be described next, which is one example according to the first exemplary embodiment described above. FIG. 4 is a block diagram of a DC offset cancel circuit 200 according to the first example. Hereinafter, with reference to FIG. 4, a configuration of the DC offset cancel circuit 200 will be described. In the DC offset cancel circuit 200, the IF unit 2 includes an IF amplifier 11, an IF_LPF 12, and an IF_AGC amplifier 13. The DC component extractor 5 is composed of a circuit including a combination of resistors and capacitors. The other structures and the operations are similar to those of the DC offset cancel circuit 100 shown in FIG. 1, and thus description thereof will be omitted.

Subsequently, reduction of the DC offset component will be described in detail with some numerical values. Assume that the gain of the IF unit 2 is 100 times and the gain of the DC offset cancel amplifier 6 is 10 times. Assume further that the DC potentials of the output of the mixer 1 (I_in, Ib_in, Q_in, and Qb_in) are as follows.

$I\_in=1.795$ V $Ib\_in=1.805$ V $Q\_in=1.802$ V $Qb\_in=1.798$ V

Thus, the following expressions are obtained.

$\Delta Vin\_I = +10$ mV $\Delta Vin\_Q = -4$ mV

Note that the ideal DC potential of both of the input part and the output part is 1.8 V.

When the DC offset cancel circuit is not used, the DC offset component in the ADC input part is equal to a multiple of the gain of the IF unit 2. Thus, when the outputs in this case are represented by Iout_0, Ibout_0, Qout_0, and Qbout_0, the following expressions are satisfied.

$I\_out0 = 1.8\text{V} - 10 \text{ mV}/2 \times 100 = 1.300$ V $Ib\_out0 = 1.8\text{V} + 10 \text{ mV}/2 \times 100 = 2.300$ V $Q\_out0 = 1.8\text{V} + 4 \text{ mV}/2 \times 100 = 2.000$ V $Qb\_out0 = 1.8\text{V} - 4 \text{ mV}/2 \times 100 = 1.600$ V Hence, the following expression will be obtained.

$\Delta Vout\_I0 = +1000$ mV, $\Delta Vout\_Q0 = -400$ mV

On the other hand, when the DC offset components only between the signal I and the signal Ib and between the signal Q and the signal Qb are cancelled as in the DC offset cancel circuit 300 shown in FIG. 8, the following expressions are satisfied from the expression (1).

$I\_out1 = 1.8\text{V} - 10 \text{ mV}/2/10 = 1.7995$ V $Ib\_out1 = 1.8\text{V} + 10 \text{ mV}/2/10 = 1.8005$ V $Q\_out1 = 1.8\text{V} + 4 \text{ mV}/2/10 = 1.8002$ V $Qb\_out1 = 1.8\text{V} - 4 \text{ mV}/2/10 = 1.7998$ V Hence, the following expression will be obtained.

$\Delta Vout\_I1 = +1$ mV, $\Delta Vout\_Q1 = -0.4$ mV

In short, the DC offset component ΔVout in the output part is 1/B times as large as the DC offset component ΔVin in the input part.

On the other hand, according to the DC offset cancel circuit 200 of the first example, the DC offset components between the signal I and the signal Q, the signal I and the signal Qb, the signal I and the signal Qb, and the signal Ib and the signal Qb are cancelled. Hence, the following expressions are satisfied.

$I\_out2 = (I\_out1 + Q\_out1)/2 = 1.79985$ V $Ib\_out2 = (Ib\_out1 + Qb\_out1)/2 = 1.80015$ V $Q\_out2 = (I\_out1 + Q\_out1)/2 = 1.79985$ V $Qb\_out2 = (Ib\_out1 + Qb\_out1)/2 = 1.80015$ V $I\_out3 = (I\_out1 + Qb\_out1)/2 = 1.79965$ V $Ib\_out3 = (Ib\_out1 + Q\_out1)/2 = 1.80035$ V $Q\_out3 = (Ib\_out1 + Q\_out1)/2 = 1.80035$ V $Qb\_out3 = (I\_out1 + Qb\_out1)/2 = 1.79965$ V Therefore, the following expressions are obtained.

$\Delta Vout\_I2 = +0.3$ mV, $\Delta Vout\_Q2 = +0.3$ mV $\Delta Vout\_I3 = +0.7$ mV, $\Delta Vout\_Q3 = -0.7$ mV As a result, according to the DC offset cancel circuit 200, the following expressions are satisfied.

$I\_out = (I\_out2 + I\_out3)/2 = 1.79975$ V $Ib\_out = (Ib\_out2 + Ib\_out3)/2 = 1.80025$ V $Q\_out = (Q\_out2 + Q\_out3)/2 = 1.8001$ V $Qb\_out = (Qb\_out2 + Qb\_out3)/2 = 1.7999$ V Hence, the following expressions are obtained.

$\Delta Vout\_I = +0.5$ mV $\Delta Vout\_Q = -0.2$ mV

According to this configuration, the DC offset components ΔVout_I and ΔVout_Q can be reduced by half compared with the DC offset cancel circuit 300 shown in FIG. 8.

Accordingly, by including the DC offset cancel circuit according to the exemplary embodiment or the example described above in the receiving device, degradation of the receiving sensitivity and the receiving accuracy of the receiving device can be suitably suppressed.

Other Exemplary Embodiments

The present invention is not limited to the exemplary embodiment described above, but may be changed as appropriate without departing from the spirit of the present invention. For example, the DC offset cancel amplifier used in the DC offset cancel circuit according to the exemplary embodiment or the example stated above may be replaced with another functional block or element as long as it has the similar gain. Further, each DC offset cancel amplifier may be arranged separately for each of the I-channel and the Q-channel.

The gain of the DC offset cancel amplifier is only an example, and may be changed as appropriate according to the application or the like of a receiving device that is employed.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A DC offset cancel circuit comprising:
   a first mixer that converts an analog signal to output first differential signals;
   a second mixer that converts the analog signal to output second differential signals, the second differential signals having a phase perpendicular to a phase of the first differential signals;
   a direct-current component extractor that extracts direct-current components from the first differential signals and the second differential signals;
   a first AD converter that receives signals in which the direct-current components extracted from the second differential signals are fed forward to the first differential signals; and
   a second AD converter that receives signals in which the direct-current components extracted from the first differential signals are fed forward to the second differential signals.

2. The DC offset cancel circuit according to claim 1, further comprising:
   a first buffer that is connected between the first mixer and the first AD converter; and
   a second buffer that is connected between the second mixer and the second AD converter, wherein
   the direct-current component extractor extracts direct-current components from the first differential signals and the second differential signals from an input of the first buffer and an input of the second buffer, respectively.

3. The DC offset cancel circuit according to claim 1, further comprising a first amplifier that is connected between inputs of the first AD converter and the second AD converter and the direct-current component extractor, the first amplifier amplifying the direct-current components extracted from the first differential signals and the direct-current components extracted from the second differential signals.

4. The DC offset cancel circuit according to claim 1, wherein
   the direct-current components extracted from the first differential signals are fed back to opposite phases of the first differential signals output from the first mixer, and
   the direct-current components extracted from the second differential signals are fed back to opposite phases of the second differential signals output from the second mixer.

5. A receiving device comprising the DC offset cancel circuit according to claim 1, mounted therein.

6. A semiconductor device comprising the DC offset cancel circuit according to claim 1, formed therein.

7. The DC offset cancel circuit according to claim 1, further comprising:
   a first buffer that is connected between the first mixer and the first AD converter;
   a second buffer that is connected between the second mixer and the second AD converter;
   a first amplifier that is connected between the first mixer and the first buffer and amplifies the first differential signals output from the first mixer; and
   a second amplifier that is connected between the second mixer and the second buffer and amplifies the second differential signals output from the second mixer, wherein
   the direct-current components extracted from the first differential signals are fed back to inputs of opposite phases of the first amplifier, and
   the direct-current components extracted from the second differential signals are fed back to inputs of opposite phases of the second amplifier.

8. The DC offset cancel circuit according to claim 5, wherein the direct-current component extractor extracts direct-current components from the first differential signals and the second differential signals from an input of the first buffer and an input of the second buffer, respectively.

9. The DC offset cancel circuit according to claim 1, wherein
   the direct-current component extractor comprises:
      a plurality of resistors; and
      a plurality of capacitors,
   wherein a first end of each of said plurality of resistors is connected between said first and second mixers and said first and second AD converters and a second end of each of said plurality of resistors is connected to at least one capacitor of said plurality of capacitors.

10. The DC offset cancel circuit according to claim 1, further comprising a DC offset cancel amplifier connected between the direct-current component extractor and the first and second mixers, said DC offset cancel amplifier feeding back the direct-current components from said first and second differential signals.

11. The DC offset cancel circuit according to claim 1, further comprising a DC offset cancel amplifier connected between the direct-current component extractor and the first and second AD converters, said DC offset cancel amplifier feeding forward the direct-current components from said first and second differential signals.

12. The DC offset cancel circuit according to claim 1, further comprising:
   a first DC offset cancel amplifier connected between the direct-current component extractor and the first and second mixers; and
   a second DC offset cancel amplifier connected between the direct-current component extractor and the first and second AD converters,
   said first DC offset cancel amplifier feeding back the direct-current components from said first and second differential signals, and
   said second DC offset cancel amplifier feeding forward the direct-current components from said first and second differential signals.

13. The DC offset cancel circuit according to claim 12, wherein the first differential signals and the second differential signals are mutually connected through the direct-current component extractor and the second DC offset cancel amplifier.

14. The DC offset cancel circuit according to claim 12, wherein a gain of the second DC offset cancel amplifier is equal to 1.

15. The DC offset cancel circuit according to claim 12, further comprising an IF unit connected to the first DC offset cancel amplifier and connected to the second DC offset cancel amplifier through the direct-current component extractor.

16. The DC offset cancel circuit according to claim 15, wherein outputs of the IF unit are cross-connected with inputs of the first and second AD converters.

* * * * *